United States Patent
Nonaka et al.

(10) Patent No.: US 7,768,550 B2
(45) Date of Patent: Aug. 3, 2010

(54) CAMERA CAPABLE OF DATA TRANSMISSION

(75) Inventors: Osamu Nonaka, Sagamihara (JP); Kazuhiro Sato, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 1163 days.

(21) Appl. No.: 11/390,642

(22) Filed: Mar. 28, 2006

(65) Prior Publication Data
US 2006/0221191 A1    Oct. 5, 2006

(30) Foreign Application Priority Data
Apr. 5, 2005 (JP) ............................. 2005-109016
Feb. 14, 2006 (JP) ............................. 2006-037146

(51) Int. Cl.
*H04N 5/225* (2006.01)
(52) U.S. Cl. ............... 348/207.2; 348/211.1; 348/211.2
(58) Field of Classification Search ............. 348/207.1, 348/207.2, 211.1, 211.2; 358/1.15; 395/114
See application file for complete search history.

(56) References Cited

U.S. PATENT DOCUMENTS

| 6,741,271 | B1 * | 5/2004 | McConica et al. ......... 715/839 |
| 6,947,163 | B2 * | 9/2005 | Takemura .................. 358/1.15 |
| 6,954,229 | B1 * | 10/2005 | Otala ..................... 348/231.99 |
| 7,164,438 | B2 * | 1/2007 | Kindaichi ................ 348/207.1 |
| 2001/0020977 | A1 * | 9/2001 | Watanabe ................... 348/222 |
| 2005/0083411 | A1 * | 4/2005 | Cozier et al. ............. 348/211.1 |
| 2005/0157331 | A1 * | 7/2005 | Nakashima ................ 358/1.15 |
| 2006/0181612 | A1 * | 8/2006 | Lee et al. ................. 348/207.1 |
| 2007/0094703 | A1 * | 4/2007 | Nygaard et al. ............ 725/135 |
| 2008/0062268 | A1 * | 3/2008 | Ohara et al. ............. 348/207.2 |

FOREIGN PATENT DOCUMENTS

| JP | 2002-199324 | 7/2002 |
| JP | 2004-164069 | * 6/2004 |

* cited by examiner

*Primary Examiner*—Tuan Ho
*Assistant Examiner*—Kent Wang
(74) *Attorney, Agent, or Firm*—Straub & Pokotylo; John C. Pokotylo

(57) ABSTRACT

A camera according to the present invention can use a captured image of a communication target device to identify the communication target device when transmitting data to the outside. The camera includes a formatting section for converting transmission data to a format suitable for transmission to the communication target device identified.

10 Claims, 8 Drawing Sheets

CAMERA CAPABLE OF DATA TRANSMISSION

CROSS-REFERENCE TO RELATED APPLICATION

This application is based upon and claims the benefit of priority from prior Japanese Patent Application Nos. 2005-109016, filed on Apr. 5, 2005; and 2006-037146, filed on Feb. 14, 2006, the entire contents of which are incorporated herein by reference.

BACKGROUND OF THE INVENTION

1. Field of the Invention

The present invention relates to a camera and particularly to a digital camera that converts shot images to digital signals and records the digital signal.

2. Description of the Related Art

The digital camera, different from the film camera, digitizes shot images into digital data. Therefore, the digital camera can handle data in various ways other than the conventional pleasure of developing films and making prints.

For example, shot image data recorded in a memory incorporated in the camera can be transmitted to a communication target device such as a printer or a monitor connected to the camera so that the shot image data will be printed on the printer or displayed on the monitor. Further, since the camera cannot shoot if the memory is full, the shot image data can be transferred to a communication target device such as a personal computer (PC).

As a method of transferring shot image data, the application of the idea of networking prevalent in the field of PCs is proposed, for example, in Japanese Patent Laid-Open No. 2002-199324.

Further, an information control system for identifying each physical object and its position based on an image input from the camera is proposed in Japanese Patent Laid-Open No. 2004-164069.

These proposals are to incorporate imaging devices such as a camera and a printer in a PC network, and for those unaccustomed to using a PC, it is not easy to use such a camera.

In addition, it is also difficult to understand what devices are connected to the camera on the network.

BRIEF SUMMARY OF THE INVENTION

According to one aspect of the present invention, there is provided a camera comprising: a shooting section for shooting a subject; a communication section for communicating with a communication target device to send it shot data recorded in a memory; a target device identifying section for identifying the communication target device from an external image (an image of the external view) shot of the communication target device taken through the shooting section; and a formatting section for converting transmission data to a format suitable for transmission to the communication target device identified.

According to another aspect of the present invention, there is provided a transmission method for transmitting shot image data to a communication target device, comprising: shooting the communication target device; querying a database with an external image shot of the communication target device to identify the communication target device; converting the image data to a format suitable for transmission to the communication target device identified; and transmitting the converted image data to the communication target device.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

First Embodiment

Figure 1:
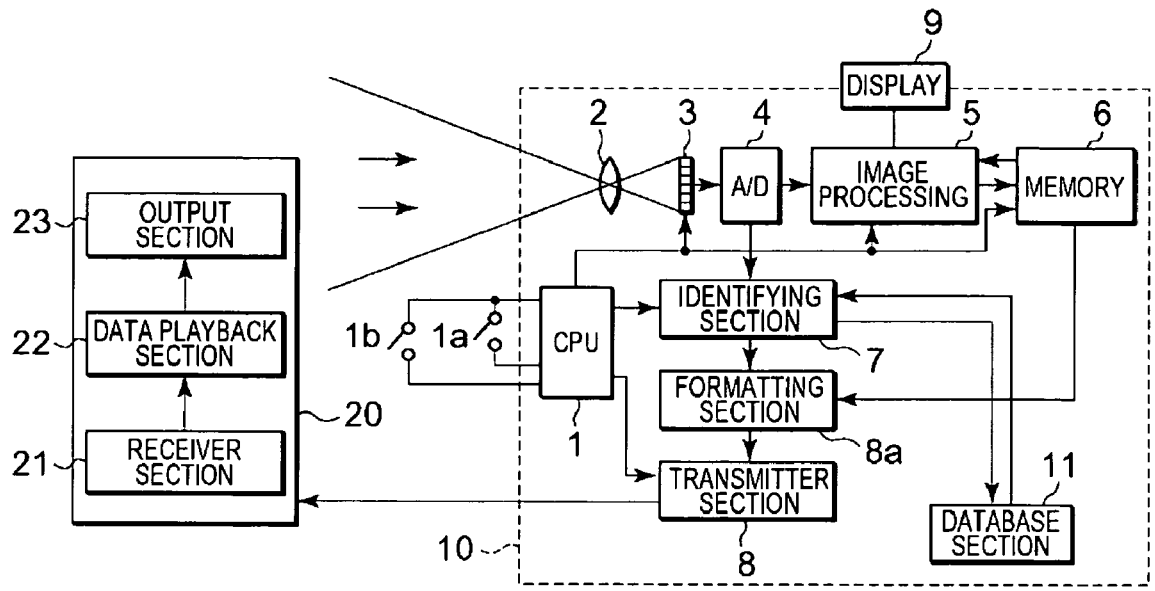
FIG. 1 is a block diagram of a camera with data transmission capability and a communication target device as the destination of shot image data according to a first embodiment of the present invention.

FIG. 1 is a block diagram of a camera 10 with data transmission capability (hereinafter called the "data transmission camera") and a communication target device 20 as the destination of shot image data according to a first embodiment of the present invention.

Like ordinary digital cameras, the data transmission camera 10 according to the first embodiment of the present invention is provided with a CPU 1 for detecting the states of a mode switch 1a, a shutter release switch 1b, etc. operated by a user to execute all shooting and other functions in a predetermined programmed sequence. The program is stored inside the CPU 1. Upon shooting, since a subject image obtained through a taking lens 2 is formed on an imager (image pickup device) 3 as an imaging section, the CPU 1 controls the exposure of the imager 3 in such a manner that the output of each pixel will fall within an optimum range according to the shades of gray in the image. The CPU 1 also controls an image processing circuit 5 to make color balance and gray gradation adjustments to the data output from the imager 3 and digitized by an A/D converter 4, compress the adjusted data, and record the resulting data in a memory 6 as a data recording section. The CPU thus controls a sequence of operations. The CPU 1 can also serve as a display control section that controls the image processing circuit 5 to show the data recorded in the memory 6 on a display section as a LCD monitor or the like. The display section 9 can also be used as a viewfinder to allow the user to monitor an image incident on the imager 3 before shooting.

Since the result of A/D conversion by the A/D converter 4 is a digital picture signal, this output can be compared with a predetermined pattern to determine what the image incident on the imager 3 is. In other words, an identifying section 7 as a target device identifying section determines in a transmission mode at which target the user is aiming the data transmission camera 10, that is, to which communication target device the user is trying to send data, using the output of the A/D converter 4 and a database section 11. The database section 11 records data retrieved to determine what the captured image of the communication target device is like. A formatting section 8a reads selected shot image data from the memory 6, decides on the destination address and protocol, and converts the image data to a format suitable for transmission. A transmitter section 8 as a communication section transmits the formatted data to the communication target device 20 (destination address) identified. The database section 11 can also be part of the memory 6.

Figure 2A:
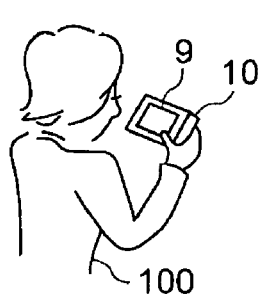
FIGS. 2A to 2F are illustrations to show an example of how to use the camera with data transmission capability according to the first embodiment of the present invention.
Figure 2C:
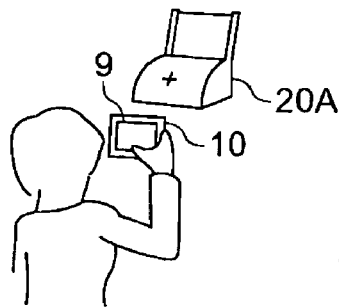
Figure 2E:
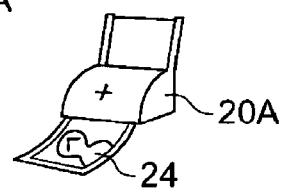
Figure 2B:
Figure 2D:
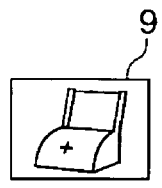
Figure 2F:
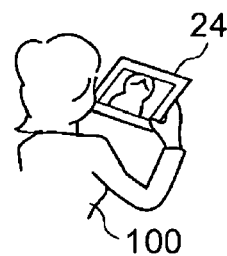

The embodiment assumes that the data transmission camera 10 is used as follows: FIG. 2A is an illustration to show that a user 100 is monitoring images taken with the data transmission camera 10 on the display section 9 provided on the back face of the data transmission camera 10. The user 100 selects an image as shown in FIG. 2B according to predetermined operations, and is trying to print the image on a printer 20A as the communication target device 20 as shown in FIG. 2C. In this process, the user 100 aims the data transmission camera 10 at the printer 20A as the communication target device 20 (destination) as shown in FIG. 2C, and shoots a picture of the printer 20A as shown in FIG. 2D while viewing the display section 9. This process allows the user 100 to designate the printer 20A as the communication target device 20. In response to this, the data transmission camera 10 uses the taking lens 2 and imaging system circuitry to identify that the communication target device 20 as the destination of the shot image data is the printer 20A. Then, the data transmission camera 10 decides on the format and protocol for transmission of the shot image data to the printer 20A so that the shot image data will be printed on the printer 20A as shown in FIG. 2E to obtain a print 24 of the selected image as shown in FIG. 2B. FIG. 2F is an illustration to show that the user 100 is enjoying the printed image 24.

Figure 3A:
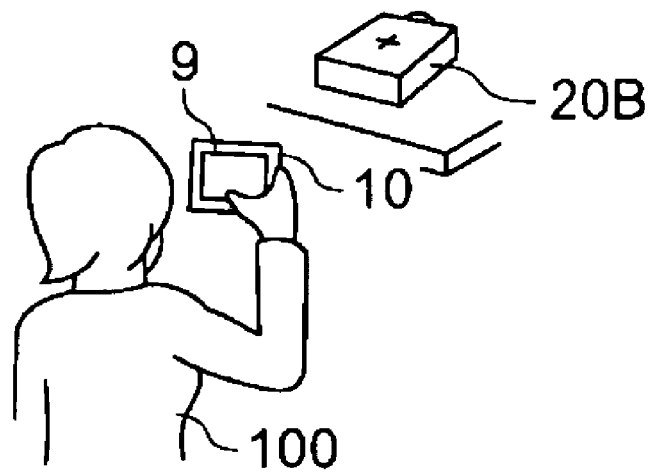
FIGS. 3A to 3C are illustrations to show another example of how to use the camera with data transmission capability according to the first embodiment of the present invention.
Figure 3B:
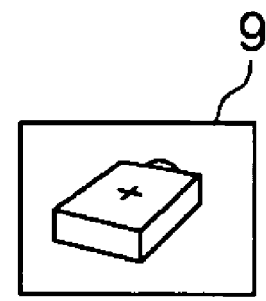
Figure 3C:
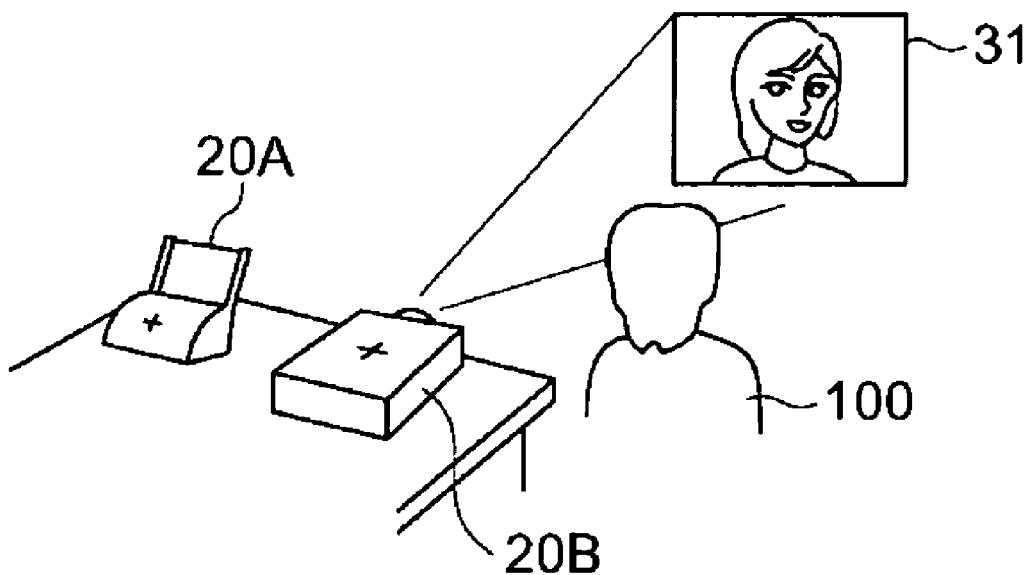

The embodiment also assumes that the data transmission camera 10 is used as follows: FIG. 3A is an illustration to show that the user 100 is sending shot image data to a projector 20B as the communication target device 20. In this process, the user 100 aims the data transmission camera 10 at the projector 20B as the destination of the shot image data to capture a picture of the projector 20B while viewing the display section 9. Since the picture of the projector 20B appears on the display section as shown in FIG. 3B, the user 100 can send correct data without taking troublesome steps and without getting the destination wrong, enjoying an image shot(s) in the way the user 100 planned. In other words, the user 100 can send shot image data to the projector 20B and enjoy a picture(s) projected on a big screen by the projector 20B as shown in FIG. 3C. Suppose here that the printer 20A is located near the projector 20B. In this case, if the user 100 aims the data transmission camera 10 at the projector 20B, that is, if the projector 20B appears on the display section 9, the shot image data will never be sent incorrectly to and printed wastefully on the printer 20A.

When communication of shot image data is carried out in a wireless fashion, simplified operations could cause data transmission to an unexpected device. In contrast, the embodiment can not only simplify the operations but prevent malfunction as well.

The communication target device 20 as the destination can be a data storage device, a PC, or a server, as well as the playback device.

In other words, in the data transmission camera 10 of FIG. 1, the identifying section 7 can determine what the picture of the communication target device 20 shown in FIG. 2D or 3B is like using a method like pattern matching. The formatting section 8a reads the selected shot image data from the memory 6, and converts it to a format suitable for transmission so that data communication will be carried out using a protocol suitable for the device. The transmitter section 8 as the communication section performs data transmission to the communication target device 20 (destination address) identified.

The shot image data thus transmitted is received at a receiver section 21 of the communication target device 20, and the received shot image data is played back by a data playback section 22, or output through an output section 23 of the communication target device 20. In other words, the received shot image data is printed on the printer 20A if the communication target device 20 is the printer 20A, or projected on a big screen if the communication target device 20 is the projector 20B.

Figure 4:
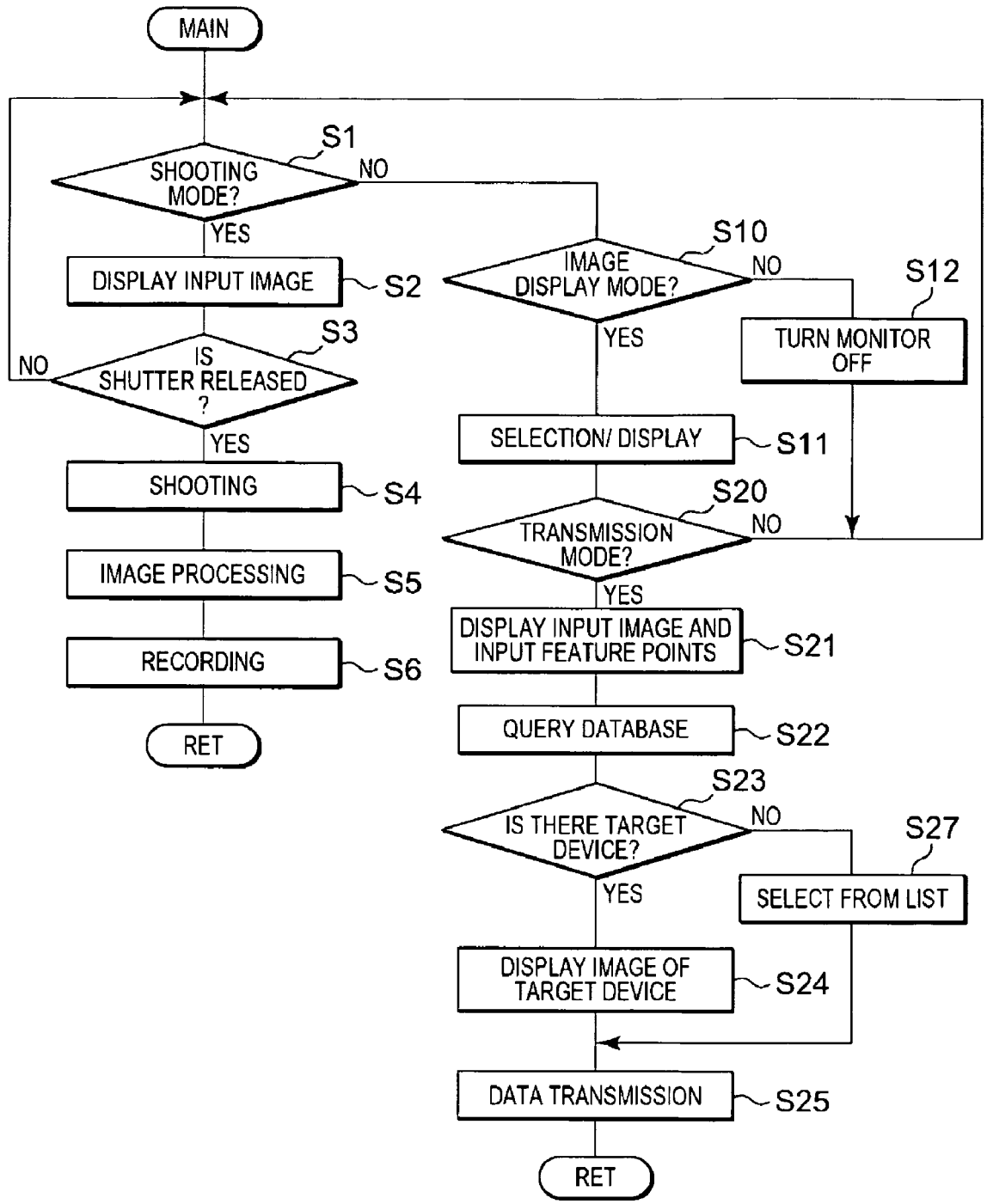
FIG. 4 is a flowchart showing the operation of a CPU of the camera with data transmission capability according to the first embodiment of the present invention.

FIG. 4 is a flowchart showing the operation of the CPU 1 of the data transmission camera 10.

First, the CPU 1 checks the state of the mode switch 1a to determine whether the user 100 selects a shooting mode to enjoy shooting (step S1). If determining that the shooting mode is selected, the CPU 1 controls the image processing circuit 5 to output an image incident on the imager 3 to the display section 9 so that the user 100 can use the display section 9 as a viewfinder (step S2). Then, the CPU 1 monitors the operation of the shutter release switch 1b (step S3) and repeats steps S1 to S3 until the shutter release switch 1b is operated. When determining that the shutter release switch 1b is operated, the CPU 1 executes a normal sequence of camera operations, such as shooting (step S4), image processing (step S5), and storage into the memory 6 (step S6).

On the other hand, if determining in step S1 that the current mode is not the shooting mode, the CPU checks the state of the mode switch 1a to determine whether the user 100 selects an image display mode to view an image(s) shot by the user 100 (step S10). If determining that the image display mode is not selected, the CPU 1 turns off the display section 9 (step S12) for energy conservation, and the procedure returns to step S1.

On the other hand, if determining that the display mode is selected (step S10), the CPU 1 controls the selection of shot image data recorded in the memory 6 or the display of the selected shot image data on the display section 9, depending on user's operations of switches (not shown) connected to the CPU 1 (step S11). After that, the CPU 1 checks the state of the mode switch 1a to determine whether the user 100 selects a transmission mode to send the selected shot image data to the communication target device 20 (step S20). If the CPU 1 determines that the transmission mode is not selected, the procedure returns to step S1.

On the other hand, if determining that the transmission mode is selected, the CPU 1 controls the image processing circuit 5 to output an image, coming through the taking lens 2 and incident on the imager 3, to the display section 9 in real time so that the user 100 can aim the data transmission camera 10 at the communication target device 20 to designate it as the transmission partner, while it performs control for inputting the feature points of the image to the identifying section 7 (step S21). In order to identify, from the feature points of the image, the communication target device 20 as the transmission partner, the CPU 1 causes the identifying section 7 to compare the feature points with data recorded in the database section 11 (step S22). If there is information on the target device in the database section 11 (step S23), the CPU 1 causes the transmitter section 8 to perform data transmission to the communication target device 20 as the transmission address using a method suitable for the communication target device 20 (step S25). During data transmission, it is preferable that the CPU should cause the display of the picture of the destination on the display section 9 so that the user 100 can check if the data is being transmitted correctly (step S24).

On the other hand, if the identifying section cannot find the information on the target device from the database section 11 (step S23), The CPU 1 causes the display of a list of target devices on the display section 9, allowing the user 100 to select from the list any communication target device 20 as the destination (step S27). The list of devices can be created using data stored in the database section 11. The list can include the external images of devices. Alternatively, the names of devices can also be listed. Then, the procedure proceeds to step S25, in which the CPU 1 causes the transmitter section 8 to perform data transmission using a method suitable for the selected communication target device 20.

As described above, this flow allows the user 100 to designate any communication target device 20 easily and perform correct data transmission suitable for the device designated.

In other words, the user 100 can make effective use of the display section 9 of the data transmission camera 10 to send shot image data to the communication target device 20 as a recording/playback device safely and reliably while checking the picture of the destination. This also allows the user 100 to assemble data or enjoy an image shot(s) in the way the user 100 planned.

Since the user 100 can designate and check the destination to which the user 100 wants to send shot image data while viewing the display section 9 of the data transmission camera 10, the user 100 cannot send data to a wrong destination. This can ensure a secure system.

Various methods are proposed for wireless data communication as shown in the embodiment. For example, Bluetooth (registered trademark) is known as technology for near-range inter-device communication. This technique uses a 2.4 GHz band, and its hardware structure has excellent mobility, featuring the adoption of frequency hopping technology, as shown in FIG. 5A, for an interference-free, multi-task communication system, which is available for simultaneous communication with a maximum of eight terminals. In the embodiment, the data transmission camera 10 can transmit data to both the printer 20A and the projector 20B at the same time, but it could also perform simultaneous communication with any other device that the user 100 is not expected.

Figure 5C:
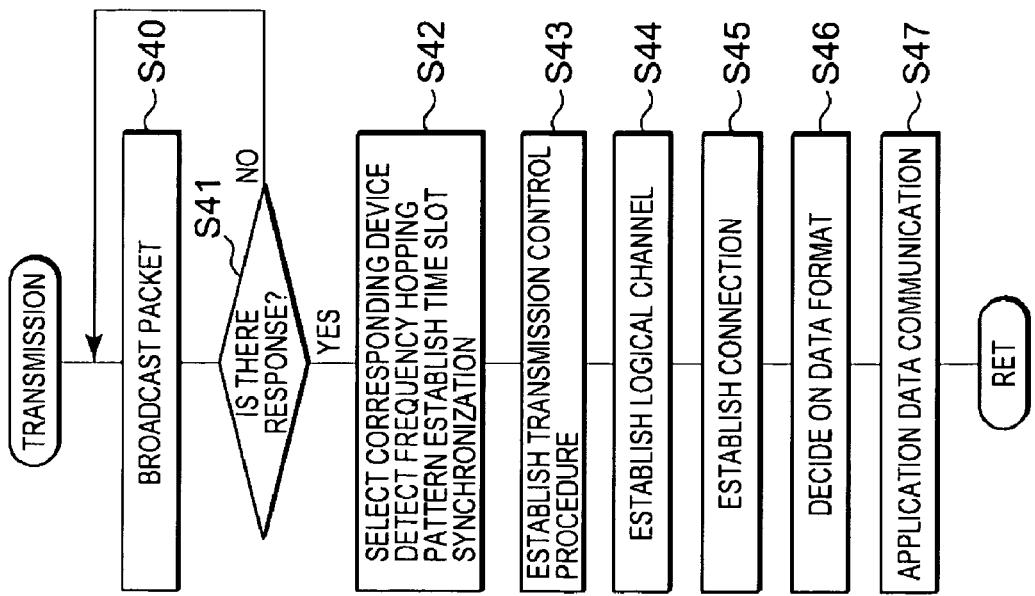
FIG. 5C is a flowchart of data transmission operation.
Figure 5A:
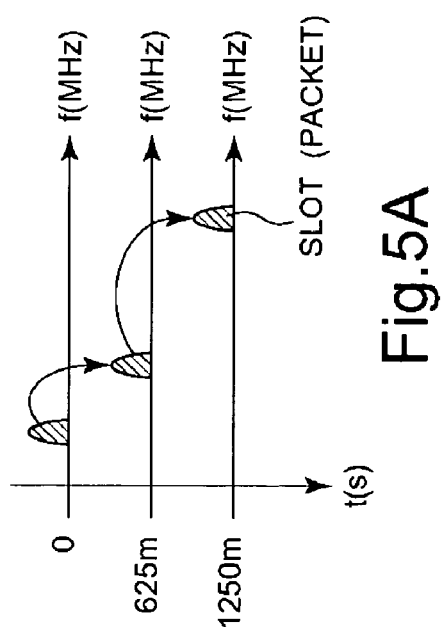
FIG. 5A is an illustration to explain frequency hopping technology.
Figure 5B:
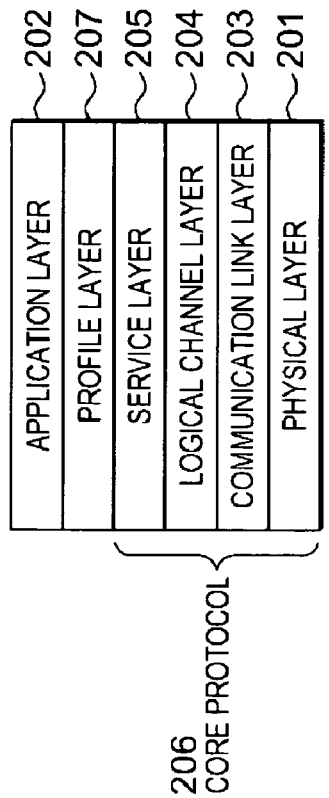
FIG. 5B shows a protocol stack to explain Bluetooth (registered trademark) technology.

The Bluetooth (registered trademark) technology is composed of a protocol stack as shown in FIG. 5B, and has a layered architecture in which several protocol layers up to an application layer 202 are stacked on a physical layer 201 that defines hardware characteristics such as the electric power consumption of a communication circuit. The application layer 202 is the layer of software that controls playback and the like using data actually communicated.

The frequency hopping is to change the communication frequency at random as time progresses along the vertical axis as shown in FIG. 5A. The physical layer 201 controls the frequency hopping cycle or the cycle of each of divided slots for communication of packets sent dividedly at every predetermined interval, for example, of 625 μsec.

Referring to a flowchart of data transmission of FIG. 5C, the data transmission camera 10 causes the transmitter section 8 to broadcast packets to know what kinds of devices are located around the data transmission camera 10 prior to data transmission (step S40). The data transmission camera 10 detects response signals (step S41) to select a corresponding communication target device 20 (transmission address) from the response signals and the image characteristics of a device captured by the user 100 during communication in the embodiment, thereby establishing synchronization with the device (step S42). The physical layer 201 in the protocol layered architecture functions to decide on the partner to be connected and establish synchronization with the frequency hopping pattern of the connection partner.

A communication link layer 203 immediately above the physical layer 201 establishes a communication link by managing a procedure of data exchange defined by a control packet (step S43). A logical channel layer 204 establishes a transmission channel for providing a logical connection between devices (step S44). A service layer 205 immediately above the logical channel layer 204 establishes the connection (step S45) as a step of establishing the logical connection using a protocol that provides means for making terminals aware of what services are available between the terminals.

The above-mentioned layers are collectively called a core protocol 206 that defines the basis of communication.

The core protocol 206 is to handle data for proper playback, and there are a profile layer 207 and the application layer 202 above the core protocol 206. These layers are used to define an application to decide on its data format (step S46), and perform data communication (step S47), respectively.

Thus, the embodiment enables secure communication with less influence of interference.

In the embodiment, the data transmission camera 10 allows the user 100 to monitor the communication destination on the display section 9 when the user 100 does not understand to which device the data transmission camera 10 is communicating with, because the data transmission camera 10 has no directional limitation due to the use of cheap and universal communication technology called Bluetooth (registered trademark), providing safe wireless communication. Of course, the embodiment can be applied to any other communication system such as wireless LAN.

Further, the two communication systems can be switched using the device identifying function of the embodiment.

Figure 6A:
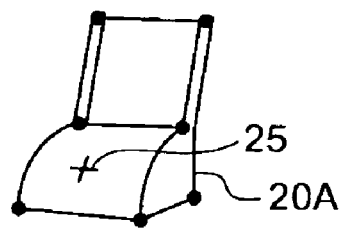
FIGS. 6A to 6D are illustrations to explain a method of identifying the communication target device as the destination.
Figure 6C:
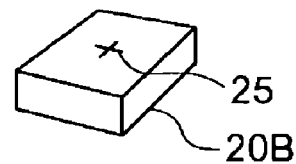
Figure 6B:
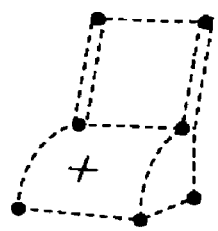
Figure 6D:
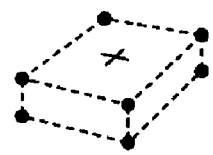

A cross mark 25 is provided as a reference aiming point for the printer 20A or the projector 20B as shown in FIGS. 6A to 6C to identify the communication destination. In this case, as shown in FIGS. 6B and 6D, the coordinates of each feature point (each black dot), such as each of the corner points defining the outline of each device, can be determined with reference to the cross mark 25 to identify the device according to the distribution of the feature points. Alternatively, the device can also be identified according to whether a majority of feature points are distributed above or below the cross mark 25.

Figure 7A:
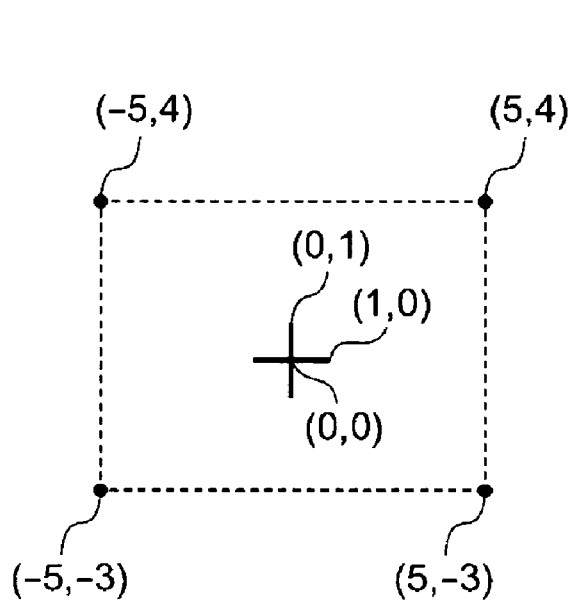
FIGS. 7A and 7B illustrations to explain the relationship between a cross mark as a reference aiming point and feature points of the communication target device.
Figure 7B:
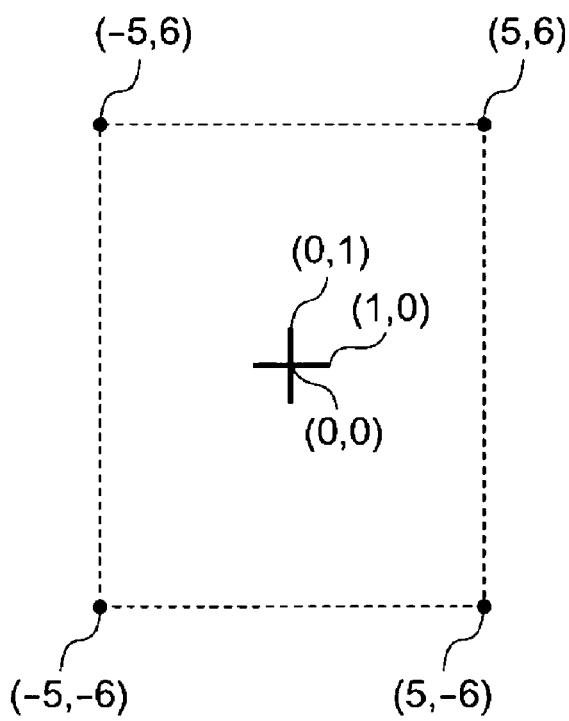

For example, as shown in FIGS. 7A and 7B, if the coordinates of the center of the cross mark 25 is set to (0, 0), each corner point of the device can be determined based on the coordinates of the length from each tip to the center of the cross mark 25. In the case of the printer 20A, the corner point coordinates are distributed as shown in FIG. 7A, while in the case of the projector 20B, the corner point coordinates are distributed as shown in FIG. 7B. If these coordinate data are prestored in the database section 11 of the data transmission camera 10, it can be determined what kind of device it is. Therefore, even if the feature points are detected in a perspective view as shown in FIG. 6B or 6D, or the detection distance between the camera and the target is changed, a correction in calculating the feature points can be made.

Further, since the memory incorporated as the database section 11 in the data transmission camera 10 has a limited capacity, all the coordinates of the feature points of all the communicable devices could not be recorded. In such a case, the data transmission camera 10 can use its communication function to update memory data from a server.

Figure 8:
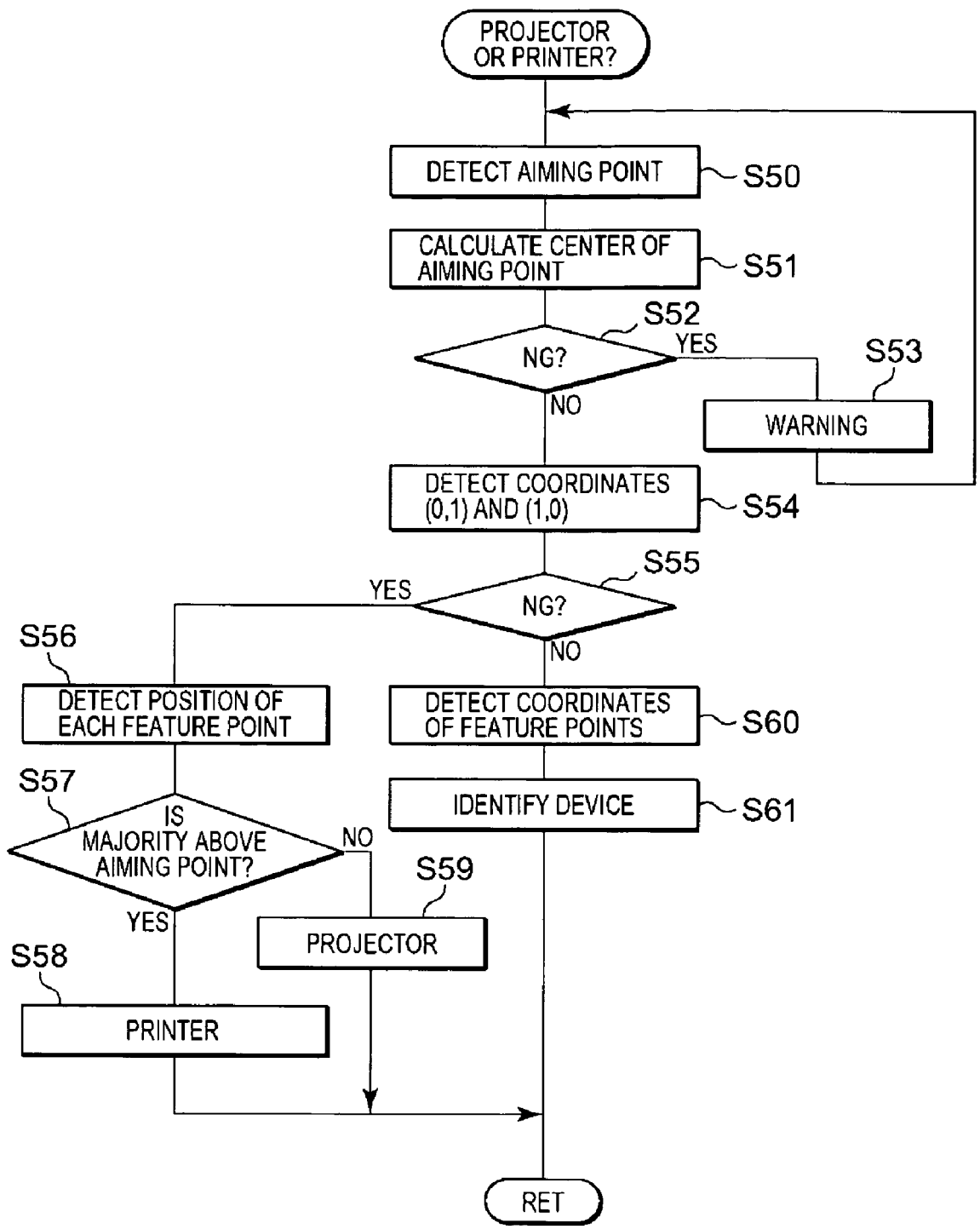
FIG. 8 is a flowchart showing the operation of an identifying section.

It is apparent from FIGS. 6B and 6D that a majority of feature points are distributed above the cross mark 25 as the reference aiming point in FIG. 6B and below the cross mark 25 in FIG. 6D. Using these characteristics, the identifying section 7 can determine whether the communication target device 20 is the printer 20A or the projector 20B according to a flowchart as shown in FIG. 8.

In other words, an image taken with the data transmission camera 10 is analyzed to detect the cross mark 25 as the reference aiming point (step S50). Next, the center coordinates are calculated to define the coordinate origin (step S51). If the aiming point cannot be detected accurately due to camera shake, or inadequate shooting distance or focal point (step S52), the data transmission camera 10 warns the user 100 (step S53), and the procedure returns to step S50. This allows the user 100 to retry to capture a picture of the communication target device 20 from the optimum position.

If it is determined that the calculation of the reference aiming point is OK (step S52), each tip of the cross mark 25 is detected to calculate its coordinates (step S54). This makes it possible to calculate basic lengths in x and y directions used in calculating the coordinates of each of the feature points. If each tip of the cross mark 25 cannot be detected (step S55), the position of each feature point is detected (step S56) to determine whether a majority of feature points are distributed above the aiming point as shown in FIG. 6B or below the aiming point as shown in FIG. 6D. Thus, the shape of the device is determined (step S57) to determine whether the destination requested by the user 100 is the printer 20A (step S58) or the projector 20B (step S59).

On the other hand, if it is determined in step S55 that the coordinates of each tip of the cross mark 25 can be detected, the coordinates of the feature points of the communication target device 20 are detected (step S60) to identify the device as a result of determination of the feature points as shown in FIGS. 7A and 7B, thereby determining which device is the communication target device 20 requested by the user 100 (step S61).

As described above, according to the embodiment, the communication target device is identified from the aiming point having length information and the coordinates of feature points defining the outline of the communication target device 20. Therefore, correct device determination can be made even if there is a variation in shooting distance to the communication target device 20 or a displacement from the optimum position. Further, since the determination based on the distribution of feature points is also made possible, the user 100 can operate the data transmission camera 10 in a stress-free manner with less warning of detection errors.

Figure 9:
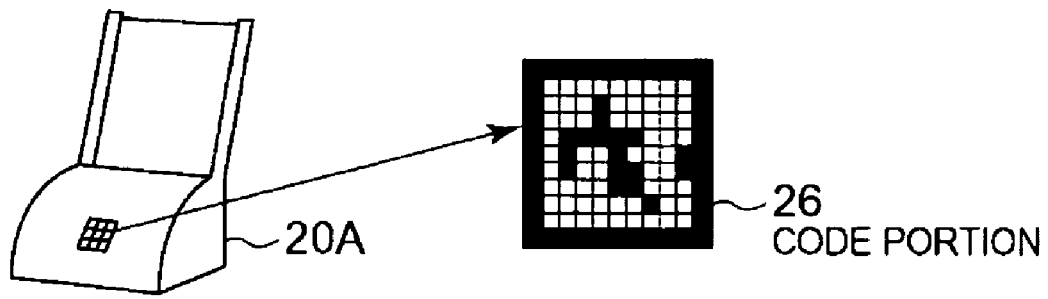
FIG. 9 is an illustration to explain another method of identifying the communication target device as the destination.

Further, as shown in FIG. 9, a code portion 26, such as a recently widespread two-dimensional code, can be attached to the outer package of the communication target device 20. In this case, the code portion 26 is read through the effective use of the shooting function of the data transmission camera 10 to identify the communication target device as the destination, enabling transmission of data in its optimum format.

Thus, according to the embodiment, the data transmission camera 10 detects the reference aiming point or the like attached to the outer package of the communication target device 20 through the effective use of its shooting function, analyzes the picture information to identify the destination designated by the user, and selects the destination address, the format, and the transmission protocol so that the optimum transmission control can be achieved.

Second Embodiment

Figure 10:
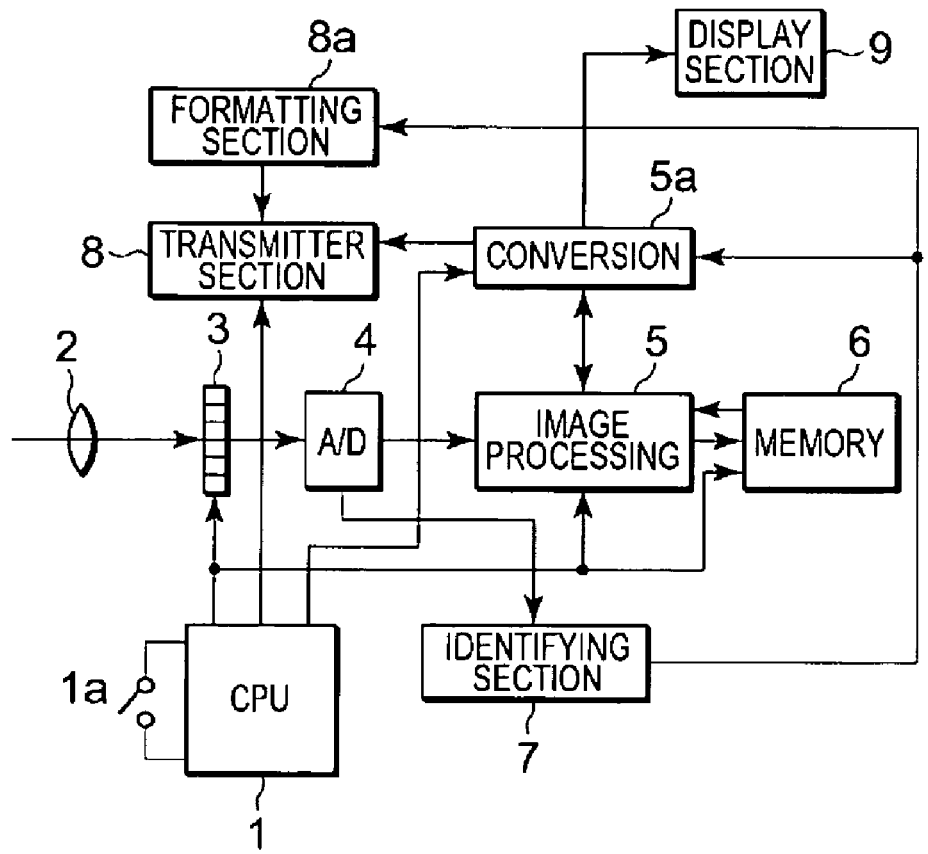
FIG. 10 is a block diagram of a camera according to a second embodiment of the present invention.

FIG. 10 is a block diagram of a camera according to a second embodiment of the present invention. In this embodiment, the camera not only decides on the destination address, the format, and the transmission protocol, but also determines the playback capability of the destination and the amount of data required, to perform efficient transmission according to the amount of data.

To this end, the camera of the embodiment has a data converting section 5a different from the block diagram of FIG. 1. In other words, the basic structure is the same as that of FIG. 1 except for the data converting section 5a. In operation, the imager 3 photoelectrically converts, to a picture signal, a subject image passing through the taking lens 2, the A/D converter 4 digitizes the picture signal into a digital signal, and the image processing circuit 5 compresses the digital signal to generate image data. The image data thus generated varies in the amount of data between when it is recorded in the memory 6 and when it is displayed on the display section 9, because the display capability of the display section 9 is generally low. Thus, the amount of data required is made different depending on the destination device even in the same image material. Similarly, it is preferable that the amount of data transmitted should be made different depending on whether the communication target device 20 as the destination is a small printer 20A or a large printer 20A, or whether it is a projector 20B having a display resolution of SVGA or a projector 20B having a display resolution of XGA. This is because the transmission of a wastefully large amount of data could disable real-time playback, especially in wireless communication due to the limited speed of wireless communication.

Figure 11:
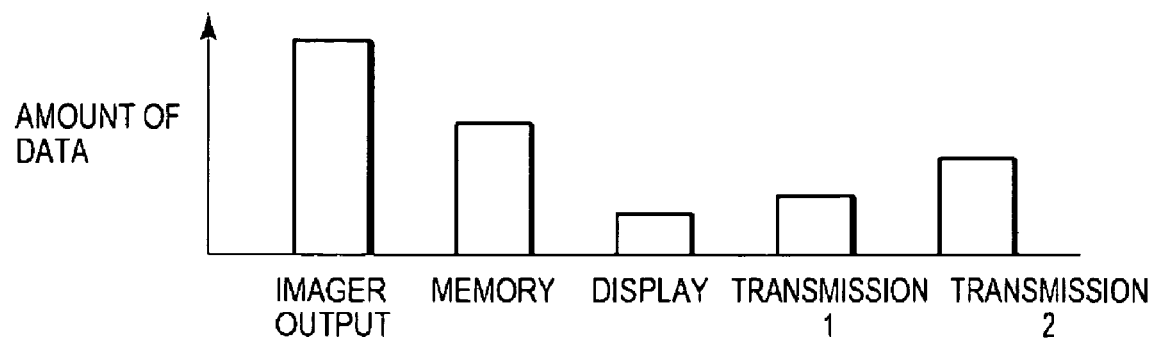
FIG. 11 is a bar chart to explain differences in the amount of data among shot image data A/D converted from the output of an imager, shot image data recorded in a memory, shot image data to be displayed on a display section, and shot image data to be transmitted.

As shown in FIG. 11, image data A/D converted from the output of the imager 3 and image data recorded in the memory 6 are different in terms of the amount or size of data, and display data for the display section 9 is further smaller. As shown, upon transmission of image data, it is also preferable to send small image data with a low resolution depending on the communication target device 20 in order to enable high-speed communication.

Figure 12:
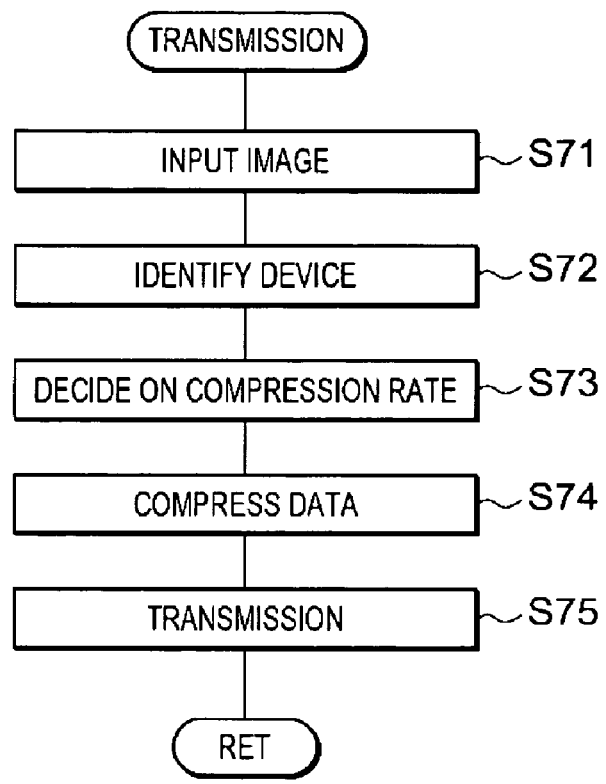
FIG. 12 is a flowchart to explain the transmission operation of the CPU of the camera according to the second embodiment of the present invention.

Therefore, as shown in a flowchart of FIG. 12, the camera according to this embodiment of the present invention acquires shot image data through the imager 3 and the A/D converter 4 (step S71), so that the identifying section 7 identifies the communication target device 20 as the destination using the shot image data (step S72). Then, according to the identification result, the formatting section 8a decides on the destination address, the protocol, etc. Further, the data converting section 5a decides on the number of pixels and the compression rate so that the size of image data recorded in the memory 6 will be made equal to the amount of data required for the communication target device 20 as the destination (step S73). Then, the data converting section 5a converts and/or compresses the image data recorded in the memory 6 according to the number of pixel and the compression rate decided (step S74). The transmitter section 8 transmits, to the communication target device 20 as the destination, the image data converted by the data converting section 5a to the amount of data required (step S75).

Thus, according to the second embodiment, the amount of data is limited according to the capability of the communication target device 20. For example, when image data is transmitted to the projector 20B or the printer 20A, the amount of data is limited according to the resolving power of the device. This enables not only simple settings in the same manner as in the first embodiment, but also high-speed transmission, providing a camera featuring a communication function capable of reducing transmission noise and transmission errors due to unexpected situational changes.

In the above-mentioned first and second embodiments, the control processing (as shown in the flowcharts of FIGS. 4, 8, and 12) is implemented mainly by the identifying section 7, the formatting section 8a, the transmitter section 8, etc. under the control of the CPU 1. In other words, it is cooperative processing between software and hardware, but all the processing steps can, of course, be implemented in software or hardware. When all the processing steps are implemented in software, since each operation is executed according to a software program, the software program itself implements the features of each of the above-mentioned embodiments. In this case, the software program itself constitutes the present invention.

These programs can be stored inside the CPU, a ROM, or a recording medium removably loaded into the camera. As the recording medium, an optical recording medium such as a DVD, a magnetic recording medium such as an MD, a tape medium, a semiconductor memory such as an IC card, etc. can be used as well as a floppy disk (registered trademark) and a CD-ROM.

In addition, although the aforementioned embodiments have taken the cameras by way of example to describe the present invention, the present invention is not limited thereto. For example, the control technique of the present invention can also be applied to various electronic devices, such as a PDA, a personal computer, and a cellar phone.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera comprising:
   a shooting section for shooting a subject;
   a communication section for communicating with a communication target device to send shot data recorded in a memory;
   a target device identifying section for identifying the communication target device from an external image shot of the communication target device taken through the shooting section; and
   a formatting section for converting transmission data to a format suitable for transmission to the communication target device identified,
   wherein the target device identifying section queries a database with the external image shot of the communication target device to identify the communication target device, and causes the display of a list of device images stored in the database when it cannot identify the device using the external image shot and the database.

2. The camera according to claim 1, wherein the target device identifying section identifies the communication target device from the outline of the communication target device obtained through the shooting section.

3. The camera according to claim 1, wherein the target device identifying section further identifies the communication target device from an image of a code portion provided on the outer package of the communication target device.

4. The camera according to claim 1 further comprising:
   a monitor section for displaying an image; and
   a display control section for causing the display of the external image of the communication target device on the monitor section when the target device identifying section identifies the communication target device.

5. The camera according to claim 1 further comprising a data converting section for converting data recorded in the memory to the amount of data required for the communication target device identified by the target device identifying section.

6. The camera according to claim 1, wherein the target device identifying section causes the display of a list of names of devices instead of the list of device images stored in the database.

7. The camera according to claim 1 further comprising:
   a monitor section for displaying an image; and
   a display control section for causing the display of the external image of the communication target device on the monitor section when a user identifies the communication target device.

8. The camera according to claim 1 further comprising a data converting section for converting data recorded in the memory to the amount of data required for the communication target device identified by a user.

9. A method of transmitting shot image data to a communication target device, comprising the steps of:
   shooting the communication target device;
   querying a database with an external image shot of the communication target device to identify the communication target device;
   causing the display of a list of device images stored in the database and allowing a user to identify the communication target device when it cannot identify the device using the external image shot and the database;
   converting the image data to a format suitable for transmission to the communication target device identified; and
   transmitting the converted image data to the communication target device.

10. A computer-readable recording medium storing a program for causing a computer to execute a method of transmitting shot image data to a communication target device, the transmission method comprising:
   shooting the communication target device;
   querying a database with an external image shot of the communication target device to identify the communication target device;
   causing the display of a list of device images stored in the database and allowing a user to identify the communication target device when it cannot identify the device using the external image shot and the database;
   converting the image data to a format suitable for transmission to the communication target device identified; and
   transmitting the converted image data to the communication target device.

* * * * *